United States Patent
Kerfoot, III (10) Patent No.: US 7,233,738 B2
(45) Date of Patent: Jun. 19, 2007

(54) PROTECTION SWITCHING ARCHITECTURE AND METHOD OF USE

(75) Inventor: Franklin W. Kerfoot, III, Red Bank, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 632 days.

(21) Appl. No.: 10/368,907

(22) Filed: Feb. 18, 2003

(65) Prior Publication Data

US 2004/0161232 A1 Aug. 19, 2004

(51) Int. Cl.
*H04B 10/08* (2006.01)
(52) U.S. Cl. .............................. 398/10; 398/17; 398/19
(58) Field of Classification Search .............. 398/4–5, 398/10, 12, 17, 19
See application file for complete search history.

(56) References Cited

U.S. PATENT DOCUMENTS

| | | | | |
|---|---|---|---|---|
| 5,539,564 A | * | 7/1996 | Kumozaki et al. ............. | 398/2 |
| 5,777,761 A | * | 7/1998 | Fee ................................ | 398/7 |
| 6,081,359 A | * | 6/2000 | Takehana et al. .............. | 398/1 |
| 6,172,782 B1 | * | 1/2001 | Kobayashi ..................... | 398/9 |
| 6,266,168 B1 | | 7/2001 | Denkin et al. | |
| 6,307,986 B1 | | 10/2001 | Duerksen et al. | |
| 6,321,004 B1 | | 11/2001 | Duerksen et al. | |
| 6,331,906 B1 | | 12/2001 | Sharma et al. | |

* cited by examiner

*Primary Examiner*—Dzung Tran
(74) *Attorney, Agent, or Firm*—Grossman Tucker Perreault & Pfleger, PLLC (57) ABSTRACT

A protection switching architecture is used in a telecommunications system such as a wavelength division multiplexed (WDM) telecommunications system to replace a failed transmission line or a failed wavelength processing device. A spare wavelength processing device transmitter replaces a failed service wavelength processing device transmitter. A spare transmission line replaces a failed service transmission line. A spare wavelength processing device receiver monitors the optical signals, one wavelength at a time, on either the spare transmission line or the service transmission line and replaces one of the service wavelength processing device receivers. Wavelength selection equipment routes either the service transmission line or the service transmission line to the service wavelength processing device receivers and selects wavelengths to be monitored by the spare wavelength processing device receiver.

22 Claims, 4 Drawing Sheets

PROTECTION SWITCHING ARCHITECTURE AND METHOD OF USE

TECHNICAL FIELD

The present invention relates to protection switching architecture. More particularly, the present invention relates to protection switching architecture in an optical telecommunications network.

BACKGROUND INFORMATION

Protection switching is a general term used to describe a technique for maintaining communication services in the event of a failure in certain equipment, for example, within a given telecommunications network. Protection switching is commonly used in electronic, optical or electronic/optical telecommunications networks. A failure may occur in either the electronic or optical equipment or in both. The failure also may occur in the physical medium used to transmit the optical signal, such as through a break in a fiber optic cable. This break may be caused by external aggressions such as through the misuse of a backhoe, a ship's anchor, a shark bite or an operator pulling out the wrong connection or turning off the wrong switch.

Referring to FIGS. 1–4, existing telecommunications systems use various protection switching techniques. The telecommunications system typically includes a physical medium or line 10 with electronic and optical equipment 12 located at regular intervals along the medium 10 and terminal equipment 14, 15 at each end of the medium 10. Transmitting terminal equipment 14 is used to prepare signals for transmitting information over the medium 10, and receiving terminal equipment 15 is used to recover the information at the receiving end of the medium. The electronic and optical equipment 12 is used in connection with the physical medium 10 to enable transmission, for example, by amplifying or regenerating the signals. Although only one direction of transmission is shown with transmitting terminal equipment at one end and receiving terminal equipment at the other end, the telecommunications system includes both receiving and transmitting terminal equipment at each end to provide transmission in both directions.

Figure 1:
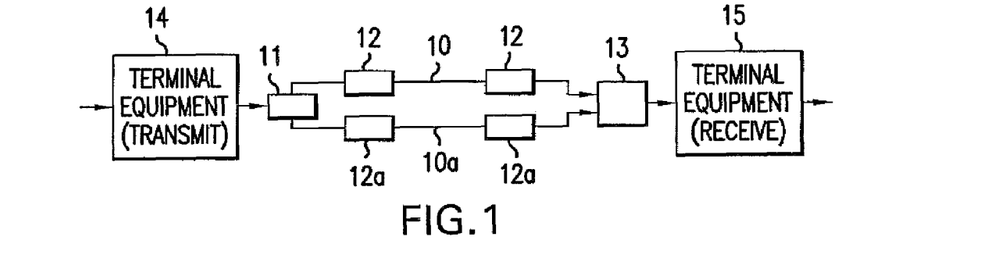
FIG. 1 is a schematic diagram of one transmission direction of a conventional protection switching technique with 1+1 line protection.

As shown in FIG. 1, many telecommunications systems protect the main physical medium 10 by providing a separate physical medium 10a installed on a physically separate route, where simultaneous damage to both media is very unlikely. Various protection-switching architectures exist to transfer communications traffic from one medium to the next in the event of a failure in the former. Spontaneous failures may also occur in the complex electronic and optical equipment 12. Where electrical and optical equipment 12 is located at regular intervals, such equipment is frequently protected in conjunction with the medium 10 by moving the traffic to the separate medium 10a, which is equipped with its own separate electronic and optical equipment 12a. In the existing system, the transmitting terminal equipment 14 can be coupled to the lines or physical media 10, 10a with a splitter 11 to provide duplicate signals over the lines 10, 10a. The receiving terminal equipment 15 can be coupled to the lines or physical media 10, 10a with a selector 13 (e.g., a 2:1 switch) to select the signal from either of the lines 10, 10a. This protection switching technique is often referred to as 1+1 line protection.

Figure 2:
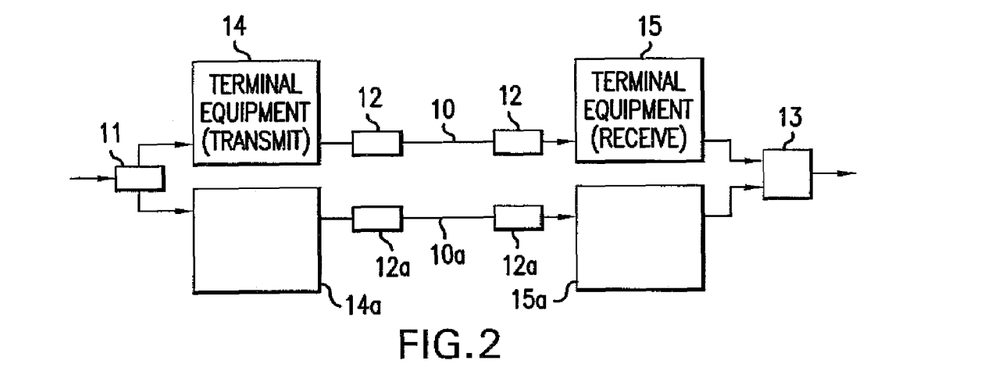
FIG. 2 is a schematic diagram of one transmission direction of a conventional protection switching technique with 1+1 combined terminal and line protection.

Failures also may occur in the terminal equipment 14, 15 at the ends of the medium 10. Several methods currently exist to protect terminal equipment against failure. One known method provides separate terminal equipment 14a, 15a, as shown in FIG. 2, for the separate, physically diverse transmission medium 10a. In this existing system, the splitter 11 is outside the transmitting terminal equipment 14, 14a to provide the same data stream to both the transmitting terminal equipment 14 and the spare transmitting terminal equipment 14a. The selector 13 is located outside of the receiving terminal equipment 15, 15a to select the data stream from either the receiving terminal equipment 15 or the spare receiving terminal equipment 15a. This protection switching technique is sometimes called 1+1 combined terminal and line protection.

This 1+1 combined terminal and line protection method requires full duplication of the terminal equipment. Because the terminal equipment can represent a large fraction of the total cost of a transmission system, this duplication of equipment adds considerable cost to the overall system. Another disadvantage to this method is the amount of physical space needed to house the extra sets of terminal equipment. Effectively, each terminal facility is likely to be double in size.

Figure 3:
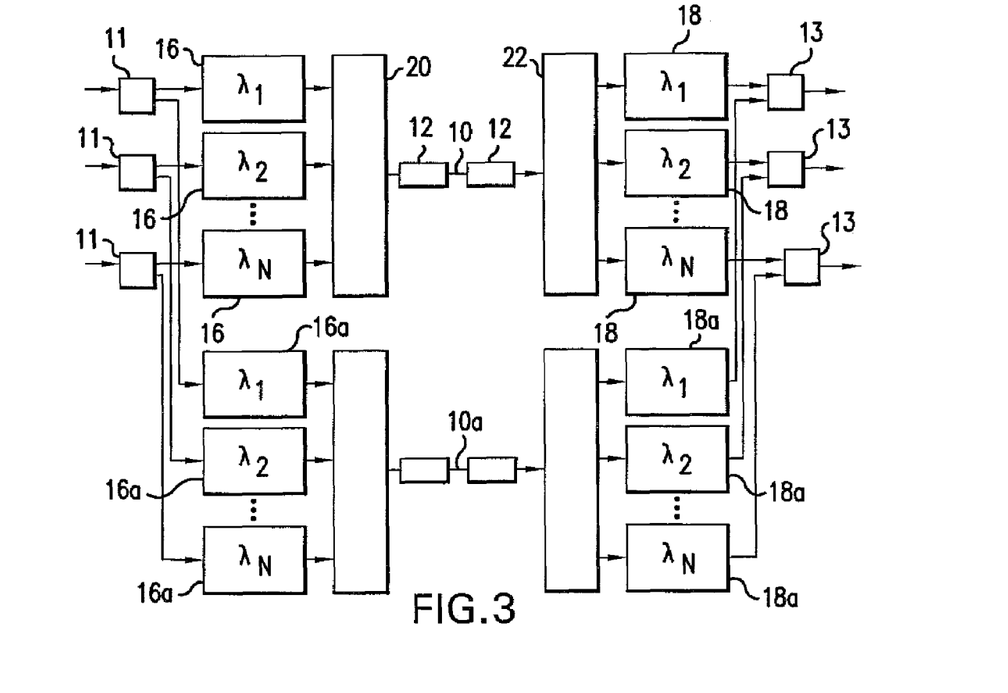
FIG. 3 is a schematic diagram of one transmission direction of a conventional protection switching technique in a WDM system with combined terminal and line protection.
Figure 4:
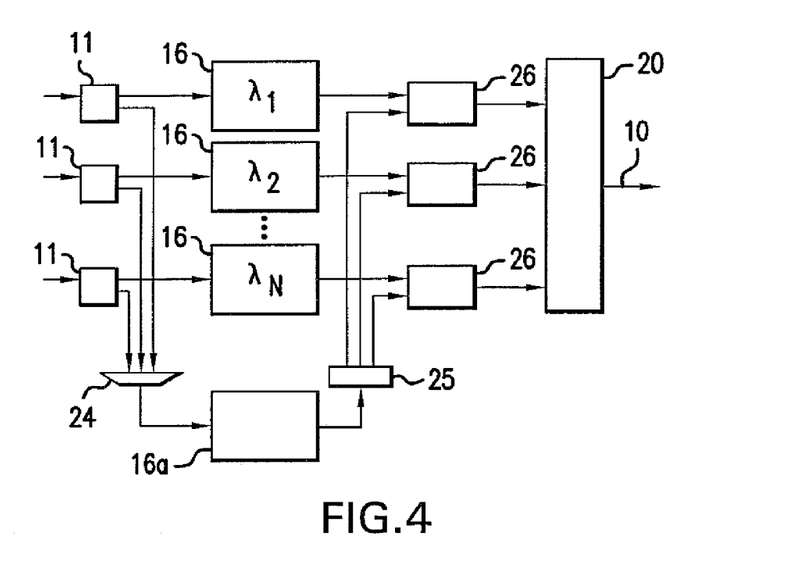
FIG. 4 is a schematic diagram of one transmission direction of a conventional protection switching technique with 1×N or 1:N equipment protection.

In one type of telecommunications system, shown in FIG. 3, separate wavelength processing devices 16, 18 are provided for separate information channels provided over the same physical medium 10, for example, through wavelength division multiplexing (WDM) of multiple channels over a single optical fiber. In a WDM system, a wavelength combining device 20 (e.g., a multiplexer) combines the separate wavelengths ($\lambda_1, \lambda_2, \ldots \lambda_N$) from the respective wavelength processing device transmitters 16 and a wavelength separating device 22 (e.g., demultiplexer) separates the wavelengths ($\lambda_1, \lambda_2, \ldots \lambda_N$) to be received by the respective wavelength processing device receivers 18. Where protection against a failure of the transmission medium is desired in such cases, a separate cable 10a with a similar number of constituent fibers is provided. Each fiber in one cable can carry multiple wavelengths, acting to protect its counterpart in the other cable. To provide 1+1 combined terminal and line protection in this case, full duplication of the terminal equipment requires duplicative wavelength processing devices 16a, 18a for each and every wavelength, again representing a considerable expense and increased floor space in the terminal facility.

Where a system includes a plurality of channels and associated wavelength processing devices 16, another approach in protecting terminal equipment is to provide a single spare wavelength processing device 16a, as shown in FIG. 4. Through switching circuits (e.g., splitters 11, selector 24, splitter 25 and selectors 26), the spare wavelength processing device 16a can be substituted for any one of the wavelength processing devices 16 at one end of the transmission path. In this system, the wavelength combining device 20 combines the N wavelengths from the wavelength processing devices 16 and the spare wavelength processing device 16a when it is substituted. This protection switching technique is commonly known as 1×N or 1:N equipment protection.

Figure 5:
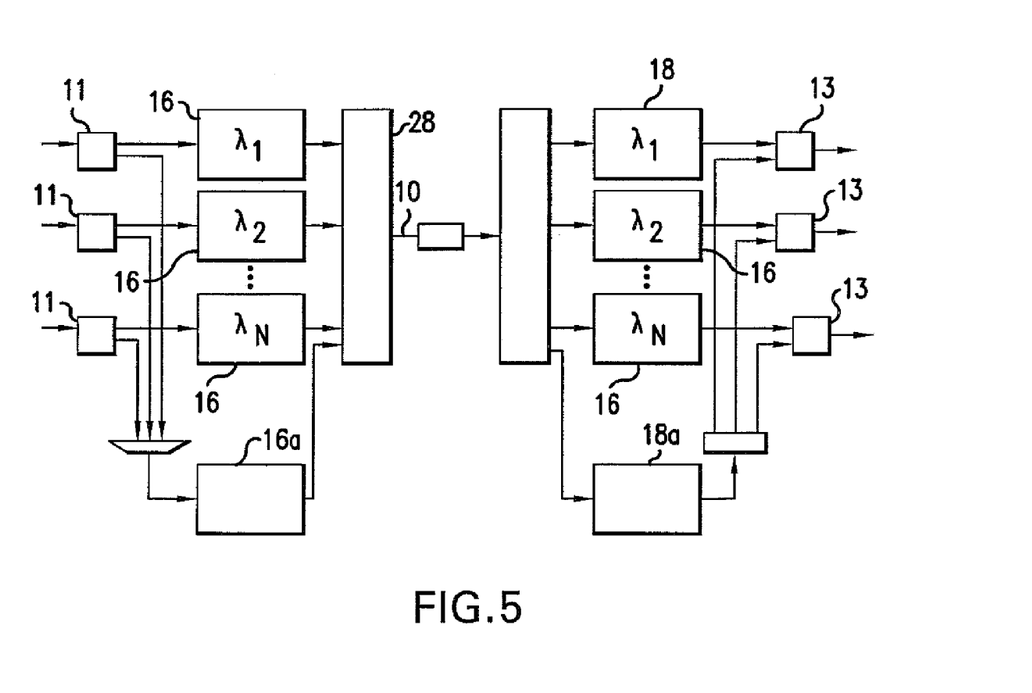
FIG. 5 is a schematic diagram of one transmission direction of a conventional protection switching technique with 1×N end-to-end path protection.

According to a variation of this method, as shown in FIG. 5, the physical transmission medium 10 includes an additional transmission path, such as an additional fiber in a cable or an additional wavelength on the same fiber in a WDM system. The additional fiber (or wavelength) is used to interconnect the spare wavelength processing devices 16a, 18a at the two ends of the system. A N+1 wavelength combining device 28 combines the wavelengths from the wavelength processing devices 16 in addition to the additional wavelength from the spare wavelength processing device 16b. The spare wavelength processing devices 16a, 18a at each end are used to protect against a failure of any one of the wavelength processing devices 16 and 18, using switching arrangements at the two ends of the transmission system. This protection switching technique is sometimes referred to as the 1×N end-to-end path protection. However, this method may not protect against damage to the physical transmission medium 10, such as a cable, unless N separate diverse routes are provided, which is practically uneconomical.

In many cases, the terminal equipment at the ends of the system is used to identify failures in the transmission medium and to initiate a protection switch. This is especially true as the length of the transmission path increases. In some systems, the presence or absence of a signal is one way of detecting a failure on the medium without the use of terminal equipment. In very long systems, however, the presence or absence of a signal does not indicate the "health" of the transmitted signal and is not necessarily an indication that the medium is capable of transmitting the signal with sufficient integrity.

Use of terminal equipment to monitor performance allows actual monitoring of bit error rate (BER) performance in a digital system. The BER verifies the measure of performance typically of importance to customers. Where the transmission method is WDM, detection of media failures with the terminal or wavelength processing device associated with each individual wavelength is desired. In general, it is desirable to monitor both diversely routed cables—to identify failures in the channel carrying traffic and to assure that the redundant channel is ready to carry service in the event the other cable fails. To provide this type of monitoring in existing systems requires separate terminal or wavelength processing devices on every wavelength of each of the two (or more) diversely routed cables. This again leads to inordinate costs and floor space.

In view of the disadvantages of the protection switching techniques mentioned above, there is a need for a protection switching system and method in telecommunications systems, especially WDM systems, which reduces the number of spare wavelength processing devices and assures proper operation of all physical media using the capabilities of the terminal equipment.

SUMMARY

To address the needs discussed above, a protection switching architecture is provided with the reliability of 1+1 line protection while minimizing the duplication of wavelength processing devices. In accordance with one aspect of the present invention, a protection switching system is provided for use in a wavelength division multiplexing (WDM) optical telecommunications system. The WDM optical telecommunications system comprises a plurality of service wavelength processing device transmitters for transmitting optical signals at respective wavelengths, a plurality of service wavelength processing device receivers for receiving the optical signals at the respective wavelengths, and at least one service transmission line coupled between the service wavelength processing device transmitters and the service wavelength processing device receivers for carrying the optical signals. The protection switching system comprises at least one spare wavelength processing device transmitter for transmitting an optical signal having a wavelength and at least one spare wavelength processing device receiver for receiving an optical signal and for monitoring optical signals having any one of the wavelengths. The spare wavelength processing device transmitter is configured to replace one of the service wavelength processing device transmitters, and the spare wavelength processing device receiver is configured to replace one of the service wavelength processing device receivers. At least one spare transmission line is coupled between the wavelength processing device transmitters and the wavelength processing device receivers for carrying the optical signals. Wavelength selection equipment selectively routes the optical signals on either the service transmission line or the spare transmission line to either the service wavelength processing device receivers or the spare wavelength processing device receiver and selects one of the wavelengths to be sent to the spare wavelength processing device receiver.

According to another aspect of the present invention, a WDM telecommunications system comprises at least one service transmission line for carrying multiplexed optical signals, at least one spare transmission line for carrying the multiplexed optical signals, and terminal equipment with protection switching at each end of the service transmission line and the spare transmission line. The terminal equipment at each end comprises a plurality of service wavelength processing devices for transmitting and receiving optical signals at a plurality of respective wavelengths and at least one spare wavelength processing device for transmitting and receiving an optical signal at a wavelength and for monitoring the optical signals at any one of the wavelengths. The spare wavelength processing device is configured to replace any one of the service wavelength processing devices. At least one wavelength combining device receives transmitted optical signals from the service wavelength processing devices and the spare wavelength processing device and combines the transmitted optical signals into an outgoing multiplexed optical signal. At least a first wavelength separating device separates an incoming multiplexed optical signal into received optical signals at the respective wavelengths. Wavelength selection equipment selectively routes the received optical signals on either the service transmission line or the spare transmission line to either the service wavelength processing devices or the spare wavelength processing device and selects one of the wavelengths to be sent to the spare wavelength processing device.

According to a further aspect of the present invention, a method is provided for protection switching in a WDM optical telecommunications system. The method comprises transmitting and receiving multiplexed optical signals over the service transmission line and the spare transmission line. Each wavelength of the multiplexed optical signal received on the spare transmission line is monitored using the spare wavelength processing device receiver. The spare transmission line is switched to the service wavelength processing device receivers when the service transmission line fails. A failed one of the service wavelength processing device transmitters is replaced with the spare wavelength processing device transmitter when the failed one of the service wavelength processing device transmitters fails.

Additional features and advantages of the invention will be set forth in the description that follows. It is to be understood that both the foregoing general description and the following detailed description are exemplary and are intended to provide further explanation of the invention as claimed.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 6:
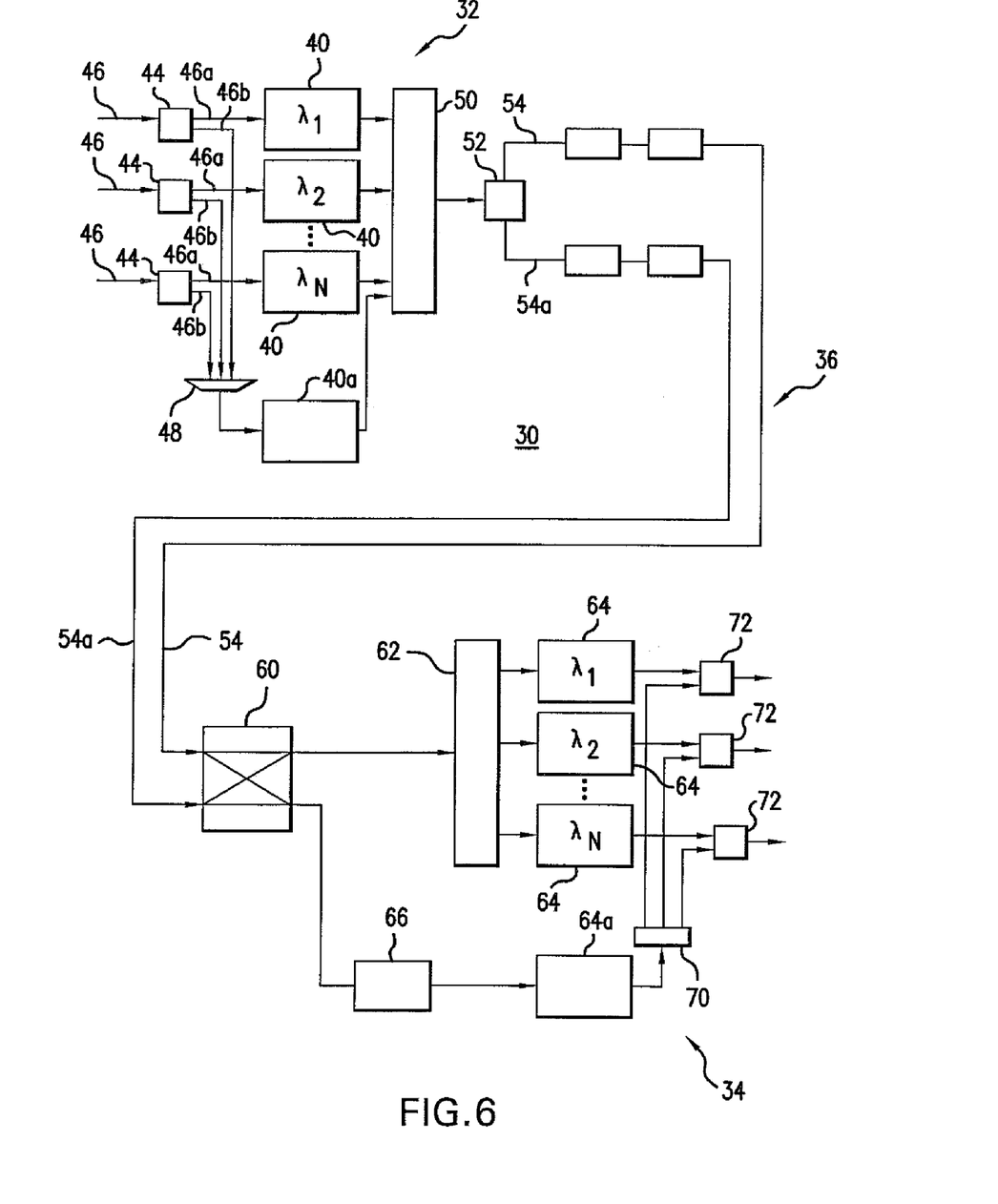
FIG. 6 is a schematic diagram of one transmission direction of a telecommunications system including a protection switching system, according to one embodiment of the present invention.

Referring to FIG. 6, a telecommunications system 30 with protection switching is described in greater detail. The exemplary telecommunications system 30 is a wavelength division multiplexed (WDM) system, although the protection switching concepts of the present invention can be used in other types of telecommunications systems. FIG. 6 shows only one transmission direction of the telecommunications system 30 including only transmitting terminal equipment 32 at one end and only receiving terminal equipment 34 at the other end connected by a one-directional transmission medium 36. To provide transmission in two directions, transmitting terminal equipment and receiving terminal equipment is integrated at each end of the telecommunications system 30 and connected by transmission media for each direction.

In one exemplary embodiment of a WDM system, the transmitting terminal equipment 32 includes service wavelength processing device transmitters 40 and a spare wavelength processing device transmitter 40a, similar to a 1×N end-to-end path protected system. The service wavelength processing device transmitters 40 transmit optical signals at N wavelengths ($\lambda_1, \lambda_2, \ldots \lambda_N$), respectively. According to one embodiment, the spare wavelength processing device transmitter 40a transmits an optical signal at a unique spare wavelength ($\lambda_S$) for a total of N+1 wavelengths allocated on the transmission medium 36. Alternatively, the spare wavelength processing device transmitter 40a can include a tunable laser capable of transmitting an optical signal at substantially any one of the N wavelengths to replace any one of the N wavelengths directly.

At the transmitting end, splitters 44 on the incoming customer data streams split each of the N incoming data streams 46 into duplicate incoming data streams 46a, 46b (i.e., service data streams and spare data streams). In one embodiment, the splitters 44 are 3 dB splitters but other values are possible. One of each of the pairs of the duplicate incoming data streams 46a are passed to the respective service wavelength processing device transmitters 40. A selector 48 receives the other half of the duplicate incoming data streams 46b (i.e., the spare data streams) and selects one of these as the input to the spare wavelength processing device transmitter 40a. Thus, the N customer data streams are processed by the wavelength processing device transmitters 40 at the N wavelengths and a duplicate of any one of those N customer data streams is processed by the spare wavelength processing device transmitter 40a at the N+1 wavelength, or at any one of the N service wavelengths when a tunable laser is used in the spare wavelength processing device transmitter.

A wavelength combining device 50 (e.g., a multiplexer) having N+1 ports combines the N+1 wavelengths (or N wavelengths in the case of the tunable laser) transmitted by the service wavelength processing device transmitters 40 and the spare wavelength processing device transmitter 40a to produce an outgoing multiplexed optical signal. In the wavelength combining device 50, the port for the spare wavelength processing device transmitter 40a can also have a tunable noise filter to strip off broadband noise caused by a noise source in the spare wavelength processing device transmitter 40a, for example, when the spare wavelength processing device transmitter 40a includes a tunable laser.

The wavelength combining device 50 is connected to a splitter 52 (e.g., a 3 dB splitter), which sends duplicate copies of the outgoing multiplexed optical signal to both a service (or working) transmission line 54 and to a spare (or protection) transmission line 54a. In the exemplary embodiment, the transmission lines include optical fibers, although any type of physical transmission medium capable of carrying optical signals can be used. The spare transmission line 54a can be routed on a physically diverse route. A terminal line amplifier (not shown) can be provided before or after the splitter 52 depending on power levels and amplifier spacing strategy.

Figure 7:
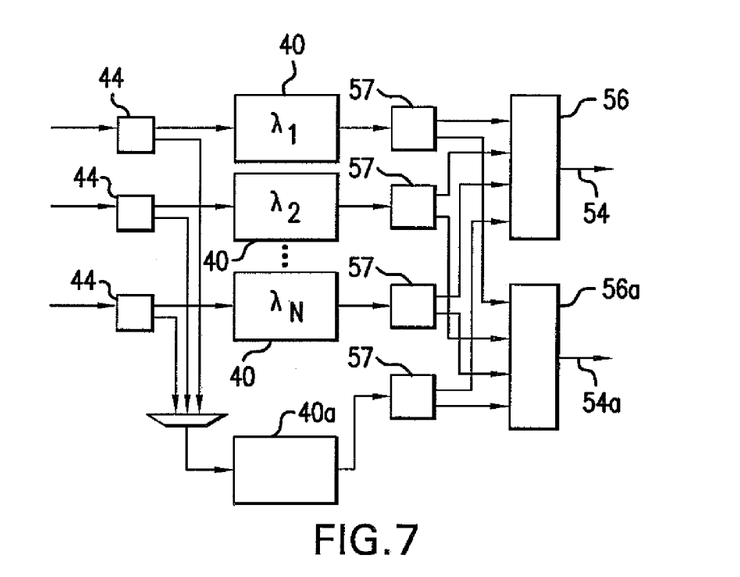
FIG. 7 is a schematic diagram of an alternative embodiment of the transmitting terminal equipment.

In an alternative embodiment of the transmitting end shown in FIG. 7, two wavelength combining devices 56, 56a can be coupled to the service transmission line 54 and spare transmission line 54a, respectively, with N+1 two-way splitters 57 coupled to the N+1 wavelength processing device transmitters 40, 40a, respectively. In this embodiment, the optical signals are split before being multiplexed and thus a failure in the service wavelength combining device 56 is protected.

At the receiving end of the embodiment shown in FIG. 6, the receiving terminal equipment 34 includes a wavelength separating device 62 (e.g., demultiplexer), service wavelength processing device receivers 64, and a spare wavelength processing device receiver 64a. A transfer switch 60 routes the incoming multiplexed optical signal on either the service transmission line 54 or the spare transmission line 54a to the wavelength separating device 62. The wavelength separating device 62 has N ports and separates the incoming multiplexed optical signal into N wavelengths. The service wavelength processing device receivers 64 receive the respective N wavelengths and the spare wavelength processing device receiver 64a receives any one of the N wavelengths or the N+1 wavelength. The wavelength processing device receivers 64, 64a are also configured to monitor the optical signals using techniques known to those of ordinary skill in the art, for example, by monitoring the bit error rate (BER).

A tunable filter 66 is coupled to the transfer switch 60 and receives the incoming multiplexed optical signal that is not routed to the wavelength separating device 62. The tunable filter 66 can be tuned to select any one of the N+1 wavelengths and feed the selected wavelength to the spare wavelength processing device receiver 64a for processing and/or monitoring. In the exemplary embodiment, the transfer switch 60 and the tunable filter 66 together act as wavelength selection equipment that selectively provides an optical signal at one of the wavelengths from either the service transmission line 54 or the spare transmission line 54a to the spare wavelength processing device receiver 64a.

A splitter 70 receives the output of the spare wavelength processing device receiver 64a. Two way selectors 72 on each outgoing customer data stream allow the substitution of the output of the spare wavelength processing device receiver 64a for any one of the service wavelength processing device receivers 64.

In one embodiment, the wavelength processing devices 40, 40a, 64, 64a are integrated as optical transponders that interface with OC-192 services. One example is the high performance optical equipment (HPOE) available from Tyco Telecommunications (US) Inc. Other types of optical transponders or devices for receiving, conditioning and transmitting optical signals can also be used for the wavelength processing device transmitters 40, 40a and receivers 64, 64a. One example of the wavelength combining device 50 and the wavelength separating device 62 is the wavelength terminating equipment (WTE) available from Tyco Telecommunications (US) Inc. Other types of known optical equipment for multiplexing and demultiplexing can also be used.

In normal operation (i.e., no failures of either a transmission line or a wavelength processing device), the multiplexed optical signal is transmitted over both the service and spare transmission lines 54, 54a, the service transmission line 54 is routed to the wavelength separating device 62, and the spare transmission line 54a is routed to the tunable filter 60. Each of the service wavelength processing device receivers 64 monitors its respective wavelength transmitted on the service transmission line 54 and delivers the respective processed data stream to the customer. The spare wavelength processing device receiver 64a sequentially monitors the wavelengths transmitted over the spare transmission line 54a, one wavelength at a time, by successively tuning the tunable filter 66 to each wavelength containing traffic. The wavelength processing device receivers 64, 64a monitor the optical signals to detect failures in the terminal equipment transmitting the optical signals or in the transmission lines carrying the optical signals.

If a failure occurs on the service transmission line 54, the failure can be detected by the wavelength processing device receivers 64 of all wavelengths carried over that line. If one or more of the service wavelength processing device receivers 64 show degraded performance or a communication error, such as an Out of Frame (OOF) indication, the spare wavelength processing device receiver 64a can then sequentially monitor those channels or wavelengths over the spare transmission line 54a to determine if a line switch is appropriate. If all of the service wavelength processing device receivers 64 show an error and the spare wavelength processing device receiver 64a shows that any one of the wavelengths is without error, the failure has likely occurred in the service transmission line 54 and a line switch can be performed without monitoring the other wavelengths.

When a failure in the service line 54 is detected, the transfer switch 60 coupled to the service line 54 and the spare line 54a is reversed such that the spare line 54a is connected to the wavelength separating device 62, restoring traffic connectivity. At the same time, the service line 54 is connected to the tunable filter 60, which is successively tuned to each wavelength containing traffic. This allows the spare wavelength processing device receiver 64a to monitor the health of the incoming service transmission line 54, one wavelength at a time, to determine when it is repaired and ready to carry traffic again.

If a failure occurs in the terminal equipment (e.g., in one of the service wavelength processing device transmitters 40), the failure can be detected by the corresponding service wavelength processing device receiver 64 at the wavelength of the failed service wavelength processing device transmitter 40. If both a service wavelength processing device receiver 64 and the spare wavelength processing device receiver 64a detect errors on a single wavelength or channel, for example, the error has likely occurred in the wavelength processing device transmitter 40 transmitting the optical signal at that wavelength.

When a failure occurs in the terminal equipment, the failed service wavelength processing device can be replaced with the spare wavelength processing device. If a failure occurs in any one of the service wavelength processing device transmitters 40, for example, the spare wavelength processing device transmitter 40a is substituted by using the selector 48 to select the spare data stream 46b associated to the failed transmitter 40. The spare wavelength processing device transmitter 40a then processes and transmits this data stream 46b. According to one method, the spare wavelength processing device transmitter 40a transmits the selected data stream 46b at a unique spare wavelength $\lambda_S$. In this case, the tunable filter 60 at the receiving end is tuned so that the spare wavelength $\lambda_S$ associated with the spare wavelength processing device transmitter 40a is fed to the spare wavelength processing device receiver 64a. The selector 72 corresponding to the channel of the failed transmitter 40 selects the signal from the spare wavelength processing device receiver 64a and substitutes it for the signal from the channel of the failed transmitter.

According to another method, the spare wavelength processing device transmitter 40a transmits the selected data stream 46b at substantially the same wavelength as the failed transmitter 40 (e.g., using a tunable laser in the spare wavelength processing device transmitter 40a). In this case, the service wavelength processing device receiver 64 corresponding to that wavelength can be used to receive and process that wavelength. In this method, only N wavelengths need to be transmitted on the line and the spare wavelength processing device receiver 64a can continue to be used to monitor either the service transmission line 54 or the spare transmission line 54a.

Figure 8:
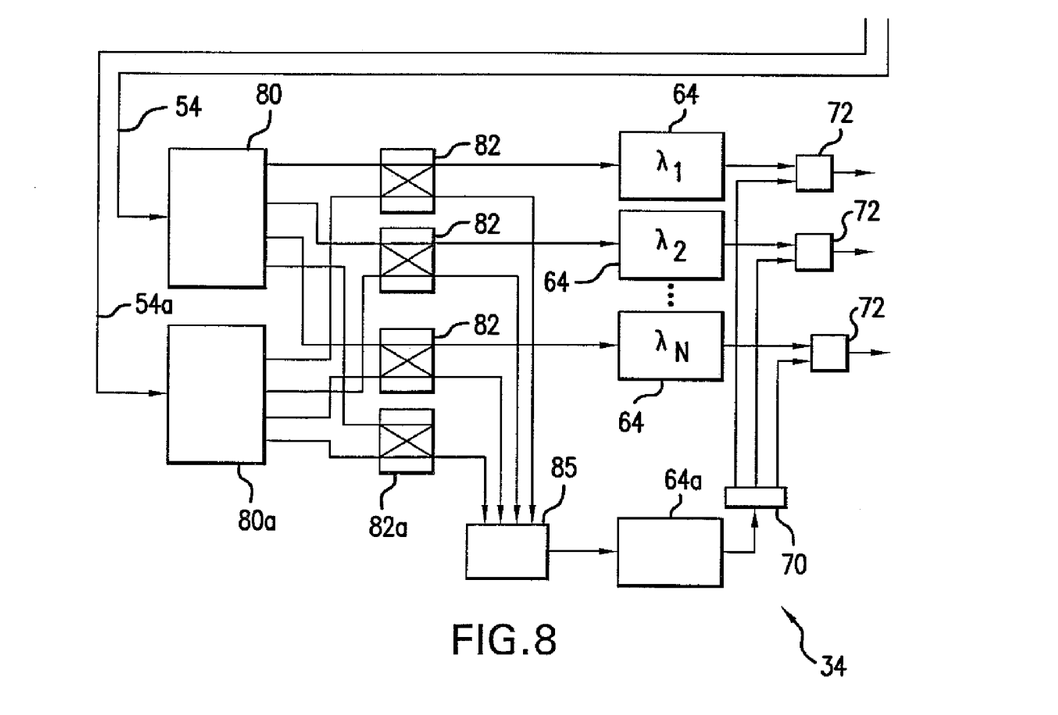
FIG. 8 is a schematic diagram of one transmission direction of a telecommunications system including a protection switching system, according to another embodiment of the present invention.

Referring to FIG. 8, another embodiment of the receiving end of a telecommunications system with protection switching is shown with like or similar elements shown with the same reference numerals. This embodiment of the receiving end can be used with either of the transmitting ends shown in FIG. 6 or FIG. 7. First and second wavelength separating devices 80, 80a (e.g., demultiplexers) are coupled to the service transmission line 54 and the spare transmission line 54a, respectively. The wavelength separating devices 80, 80a each have N+1 ports (or N ports when the transmitter uses a tunable laser) for separating the N wavelengths of the service wavelength processing device transmitters 40 and the N+1 wavelength of the spare wavelength processing device transmitter 40*a* in the case where a N+1 wavelength is used. Separate transfer switches 82 are used for each of the N wavelengths to send the respective wavelengths either to the service wavelength processing device receivers 64 or to a selector 84 for selecting one of the wavelengths to send to the spare wavelength processing device receiver 64*a*. When N+1 wavelengths are used, another transfer switch 82*a* is used to send the N+1 wavelength from either the service transmission line 54 or the spare transmission line 54*a* to the selector 84.

The method of monitoring and protection switching in the embodiment of FIG. 8 is essentially the same as described above in connection with FIG. 6. In this embodiment, however, the transfer switches 82, 82*a* and selector 84 are used as wavelength selection equipment to select one of the wavelengths from either the service line 54 or the spare line 54*a* for monitoring and/or processing by the spare wavelength processing device receiver 64*a*.

Accordingly, the protection switching system and method of the present invention uses the spare wavelength processing device to monitor the performance of a transmission line or fiber. This system and method allows the significant economy associated with 1×N terminal equipment protection and the reliability of a 1+1 protection system utilizing protected fiber paths, while maintaining the ability to monitor the health of the protection fiber on a wavelength basis using the superior fault detection capabilities of terminal equipment monitoring.

Modifications and substitutions by one of ordinary skill in the art are considered to be within the scope of the present invention, which is not to be limited except by the following claims.

The invention claimed is:

1. A protection switching system for use in a wavelength division multiplexing (WDM) optical communications system comprising a plurality of service wavelength processing device transmitters for transmitting optical signals at respective wavelengths, a plurality of service wavelength processing device receivers for receiving said optical signals at said respective wavelengths, and at least one service transmission line coupled between said service wavelength processing device transmitters and said service wavelength processing device receivers for carrying said optical signals, said protection switching system comprising:

at least one spare wavelength processing device transmitter for transmitting an optical signal at a spare wavelength separate from said wavelengths of said optical signals transmitted by said service wavelength processing device transmitters, and wherein said spare wavelength processing device transmitter is configured to replace one of said service wavelength processing device transmitters;

at least one spare wavelength processing device receiver for receiving an optical signal, wherein said spare wavelength processing device receiver is configured to replace one of said service wavelength processing device receivers, and wherein said spare wavelength processing device receiver is configured to monitor optical signals having any one of said wavelengths when said spare wavelength processing device receiver is not being used to replace one of said service wavelength processing device receivers;

at least one spare transmission line coupled between said wavelength processing device transmitters and said wavelength processing device receivers for carrying said optical signals; and wavelength selection equipment for selectively routing said optical signals on either said service transmission line or said spare transmission line to either said service wavelength processing device receivers or said spare wavelength processing device receiver and for selecting one of said wavelengths to be sent to said spare wavelength processing device receiver, wherein said wavelength selection equipment is configured to sequentially provide each of said wavelengths of said optical signals on either said spare transmission line or said service transmission line to said spare wavelength processing device receiver for monitoring by said spare wavelength processing device receiver when said spare wavelength processing device receiver is not being used to replace one of said service wavelength processing device receivers.

2. The protection switching system of claim 1 wherein said wavelength selection equipment comprises:

a transfer switch coupled to said service transmission line and said spare transmission line for switching one of said service transmission line or said spare transmission line to said service wavelength processing device receivers and the other to said spare wavelength processing device receiver; and a tunable filter coupled between said transfer switch and said spare wavelength processing device receiver for selecting one of said wavelengths to be sent to said spare wavelength processing device receiver, wherein said tunable filter is configured to sequentially selects each of said wavelengths when said spare wavelength processing device receiver is monitoring said optical signals, and wherein said tunable filter is configured to selects said spare wavelength when said spare wavelength processing device receiver replaces one of said service wavelength processing device receivers.

3. The protection switching system of claim 1 wherein said wavelength selection equipment comprises:

at least first and second wavelength separating devices coupled to said service transmission line and said spare transmission line, respectively, for separating said optical signals based on said wavelengths;

a plurality of transfer switches coupled to said first and second wavelength separating devices for switching respective optical signals from one of said first and second wavelength separating devices to said service wavelength processing device receivers and the other to said spare wavelength processing device receiver; and a selector coupled to said transfer switches for selecting one of said wavelengths to be sent to said spare wavelength processing device receiver, wherein said selector is configured to sequentially selects each of said wavelengths when said spare wavelength processing device receiver is monitoring said optical signals, and wherein said selector is configured to selects said spare wavelength when said spare wavelength processing device receiver replaces one of said service wavelength processing device receivers.

4. The protection switching system of claim 1 wherein said spare wavelength processing device transmitter is configured to transmit said optical signal at substantially the same wavelength of one of said service wavelength processing device transmitters.

5. The protection switching system of claim 4 wherein said spare wavelength processing device transmitter includes a tunable laser.

6. The protection switching system of claim 4 wherein said wavelength selection equipment comprises:
   a transfer switch coupled to said service transmission line and said spare transmission line for switching one of said service transmission line or said spare transmission line to said service wavelength processing device receivers and the other to said spare wavelength processing device receiver; and
   a tunable filter coupled between said transfer switch and said spare wavelength processing device receiver for selecting one of said wavelengths to be sent to said spare wavelength processing device receiver, wherein said tunable filter is configured to sequentially selects each of said wavelengths when said spare wavelength processing device receiver is monitoring said optical signals, and wherein said tunable filter is configured to selects substantially the same wavelength being replaced when said spare wavelength processing device receiver replaces one of said service wavelength processing device receivers.

7. The protection switching system of claim 4 wherein said wavelength selection equipment comprises:
   at least first and second wavelength separating devices coupled to said service transmission line and said spare transmission line, respectively, for separating said optical signals based on said wavelengths;
   a plurality of transfer switches coupled to said first and second wavelength separating devices for switching respective optical signals from one of said first and second wavelength separating devices to said service wavelength processing device receivers and the other to said spare wavelength processing device receiver; and
   a selector coupled to said transfer switches for selecting one of said wavelengths to be sent to said spare wavelength processing device receiver, wherein said selector is configured to sequentially selects each of said wavelengths when said spare wavelength processing device receiver is monitoring said optical signals, and wherein said selector is configured to selects substantially the same wavelength being replaced when said spare wavelength processing device receiver replaces one of said service wavelength processing device receivers.

8. A protection switching system for use in a wavelength division multiplexing (WDM) optical communications system comprising a plurality of service wavelength processing device transmitters for transmitting optical signals at respective wavelengths, a plurality of service wavelength processing device receivers for receiving said optical signals at said respective wavelengths, and at least one service transmission line coupled between said service wavelength processing device transmitters and said service wavelength processing device receivers for carrying said optical signals, said protection switching system comprising:
   at least one spare wavelength processing device transmitter for transmitting an optical signal having a wavelength, wherein said spare wavelength processing device transmitter is configured to replace one of said service wavelength processing device transmitters;
   at least one spare wavelength processing device receiver for receiving an optical signal, wherein said spare wavelength processing device receiver is configured to replace one of said service wavelength processing device receivers, and wherein said spare wavelength processing device receiver is configured to monitor optical signals having any one of said wavelengths when said spare wavelength processing device receiver is not being used to replace one of said service wavelength processing device receivers;
   at least one spare transmission line coupled between said wavelength processing device transmitters and said wavelength processing device receivers for carrying said optical signals;
   means for selectively routing said optical signals on either said service transmission line or said spare transmission line to either said service wavelength processing device receivers or said spare wavelength processing device receiver and for selecting one of said wavelengths to be sent to said spare wavelength processing device receiver; and
   means for sequentially providing each of said wavelengths of said optical signals on either said spare transmission line or said service transmission line to said spare wavelength processing device receiver for monitoring by said spare wavelength processing device receiver when said spare wavelength processing device receiver is not being used to replace one of said service wavelength processing device receivers.

9. The protection switching system of claim 8 wherein said spare wavelength processing device transmitter is configured to transmit said optical signal at a spare wavelength separate from said wavelengths of said optical signals transmitted by said service wavelength processing device transmitters.

10. The protection switching system of claim 8 wherein said spare wavelength processing device transmitter is configured to transmits said optical signal at substantially the same wavelength of one of said service wavelength processing device transmitters.

11. The protection switching system of claim 10 wherein said spare wavelength processing device transmitter includes a tunable laser.

12. A wavelength division multiplexing (WDM) communications system comprising:
   at least one service transmission line for carrying multiplexed optical signals;
   at least one spare transmission line for carrying said multiplexed optical signals; and
   terminal equipment with protection switching at each end of said at least one service transmission line and said at least one spare transmission line, said terminal equipment at each end comprising:
      a plurality of service wavelength processing devices for transmitting and receiving optical signals at a plurality of respective wavelengths;
      at least one spare wavelength processing device for transmitting and receiving an optical signal at a spare wavelength separate from said wavelengths of said optical signals transmitted by said service wavelength processing devices, wherein said spare wavelength processing device is configured to replace any one of said service wavelength processing devices, and wherein said spare wavelength processing device is configured to monitor optical signals having any one of said wavelengths when said spare wavelength processing device is not being used to receive said spare wavelength;
      at least one wavelength combining device for receiving transmitted optical signals from said service wavelength processing devices and said spare wavelength processing device and for combining said transmitted optical signals into an outgoing multiplexed optical signal;

at least a first wavelength separating device for separating an incoming multiplexed optical signal into received optical signals at said plurality of respective wavelengths; and wavelength selection equipment for selectively routing said received optical signals on either said service transmission line or said spare transmission line to either said service wavelength processing devices or said spare wavelength processing device and for selecting one of said wavelengths to be sent to said spare wavelength processing device, wherein said wavelength selection equipment is configured to sequentially provide each of said wavelengths of said received optical signals on either said spare transmission line or said service transmission line to said spare wavelength processing device for monitoring by said spare wavelength processing device when said spare wavelength processing device is not being used to receive said spare wavelength.

13. The WDM communications system of claim 12 wherein said spare wavelength processing device is configured to transmit said optical signal at substantially the same wavelength of one of said service wavelength processing devices.

14. The WDM communications system of claim 13 wherein said spare wavelength processing device includes a tunable laser.

15. The WDM communications system of claim 12 wherein said terminal equipment further comprises:

splitters coupled to respective incoming data streams coming in to said service wavelength processing devices for splitting each of said incoming data streams into service and spare incoming data streams, wherein said service incoming data streams are sent to respective said service wavelength processing devices; and a selector for selecting one of said spare incoming data streams from one of said splitters and passing said one of said spare incoming data streams to said spare wavelength processing device.

16. The WDM communications system of claim 12 wherein said terminal equipment further comprises:

a splitter coupled to said spare wavelength processing device for receiving an outgoing data stream; and selectors coupled to respective outgoing data streams from each of said service wavelength processing devices and said splitter for selecting outgoing data streams from either said spare wavelength processing device or one of said service wavelength processing devices.

17. The WDM communications system of claim 12 further comprising a splitter coupled to said wavelength combining device for splitting said outgoing multiplexed optical signal into at least two duplicate outgoing multiplexed optical signals for carrying over said service transmission line and said spare transmission line.

18. The WDM communications system of claim 12 further comprising a plurality of splitters coupled to said wavelength processing devices respectively, for splitting said optical signals into services transmitted optical signals and spare transmitted optical signals, and wherein said at least one wavelength combining device includes first and second wavelength combining devices for combining said service transmitted optical signals and said spare transmitted optical signals, respectively.

19. A method for protection switching in a wavelength division multiplexing (WDM) optical communications system comprising a plurality of service wavelength processing device transmitters for transmitting optical signals at respective wavelengths, a plurality of service wavelength processing device receivers for receiving said optical signals at said respective wavelengths, and at least one service transmission line coupled between said service wavelength processing device transmitters and said service wavelength processing device receivers for carrying said optical signals, said method comprising:

providing a spare wavelength processing device transmitter, a spare wavelength processing device receiver, and a spare transmission line;

transmitting and receiving multiplexed optical signals over said service transmission line and said spare transmission line;

monitoring each wavelength of said multiplexed optical signal received on said spare transmission line using said spare wavelength processing device receiver;

switching said spare transmission line to said service wavelength processing device receivers when said service transmission line fails;

monitoring each wavelength of said multiplexed optical signals received on said service transmission line using said spare wavelength processing device receiver while said spare transmission line is switched to said service wavelength processing device receivers; and replacing a failed one of said service wavelength processing device transmitters with said spare wavelength processing device transmitter when said failed one of said service wavelength processing device transmitters fails.

20. The method of claim 19 wherein said spare wavelength processing device transmitter is configured to transmit an optical signal at a spare wavelength separate from said wavelengths of said service wavelength processing device transmitters.

21. The method of claim 19 further comprising replacing a service wavelength processing device receiver corresponding to said failed one of said service wavelength processing device transmitters with said spare wavelength processing device receiver, wherein said spare wavelength of said multiplexed optical signals is passed to said spare wavelength processing device receiver.

22. The method of claim 19 wherein said spare wavelength processing device transmitter transmits said optical signal at substantially the same wavelength as said failed one of said service wavelength processing device transmitters.

* * * * *